United States Patent
Sigal et al.

(10) Patent No.: US 11,074,391 B2
(45) Date of Patent: Jul. 27, 2021

(54) CHARACTERIZING AND SIMULATING LIBRARY GATES TO ENABLE IDENTIFICATION AND ELIMINATION OF ELECTROMIGRATION VIOLATIONS IN SEMICONDUCTOR CHIPS

(71) Applicant: International Business Machines Corporation, Armonk, NY (US)

(72) Inventors: Leon Sigal, Monsey, NY (US); David Kadzov, South Burlington, VT (US); Nagashyamala R. Dhanwada, Tenafly, NJ (US); James Douglas Warnock, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 16/253,812

(22) Filed: Jan. 22, 2019

(65) Prior Publication Data
US 2020/0233933 A1    Jul. 23, 2020

(51) Int. Cl.
*G06F 30/30*     (2020.01)
*G06F 30/398*    (2020.01)
(Continued)

(52) U.S. Cl.
CPC .......... *G06F 30/398* (2020.01); *G06F 30/337* (2020.01); *G06F 30/3308* (2020.01); *G06F 30/3312* (2020.01); *G06F 30/33* (2020.01); *G06F 30/36* (2020.01); *G06F 2111/20* (2020.01); *G06F 2119/02* (2020.01); *G06F 2119/06* (2020.01); *G06F 2119/08* (2020.01);
(Continued)

(58) Field of Classification Search
None
See application file for complete search history.

(56) References Cited

U.S. PATENT DOCUMENTS

| 5,995,732 A | 11/1999 | Murai |
| 6,038,383 A * | 3/2000 | Young .................. G06F 30/367 716/113 |

(Continued)

FOREIGN PATENT DOCUMENTS

| JP | 2002149740 A | 5/2002 |
| JP | 2008257377 A | 10/2008 |

OTHER PUBLICATIONS

C. Oh et al., "A Methodology for Cip-Level Electromigration Risk Assessment and Product Qualification," 2004 IEEE Computer Society, 6 pages. (Year: 2004).*

(Continued)

*Primary Examiner* — Leigh M Garbowski
(74) *Attorney, Agent, or Firm* — Erik Johnson; Otterstedt, Wallace & Kammer, LLP

(57) ABSTRACT

A method and system for improving the performance of a computer in identifying and mitigating electromigration violations of a semiconductor device. A set of library gates is obtained and parasitic layout extraction is performed for each gate in the set of library gates to generate an extracted netlist. One or more passes of an electromigration analysis of the extracted netlist are performed to characterize each gate over a set of input parameters and to generate a maximum slew rate (MAX_SLEW) table and a maximum capacitance (MAX_CAP) table.

9 Claims, 13 Drawing Sheets

MAX_SLEW Table
100C/100,000 POH
404

| | Frequency in GHz | | | | | | |
|---|---|---|---|---|---|---|---|
| | 0.1 | 0.3 | 0.6 | 1.3 | 2.6 | 5.2 | 8.0 |
| 0.6 | 1e-9 | | | | | | |
| 0.7 | | | | | | | |
| 0.8 | | | Each Entry Indicates | | | | |
| 0.9 | | | Maximum Allowed | | | | |
| 1.0 | | | Input Slew | | | | |
| 1.1 | | | | | | | |
| 1.2 | | | | | | | -1 |

Voltage in Volts

MAX_CAP Table
100C/100,000
POH/25 MHz
408

| | Input Slew in ps | | | | | | |
|---|---|---|---|---|---|---|---|
| | 4 | 20 | 40 | 80 | 160 | 400 | 2K |
| 0.6 | 1e12 | | | | | | |
| 0.7 | | | | | | | |
| 0.8 | | | Each Entry Indicates | | | | |
| 0.9 | | | Maximum Allowed | | | | |
| 1.0 | | | Output Capacitance | | | | |
| 1.1 | | | | | | | |
| 1.2 | | | | | | | -1 |

Voltage in Volts

(51) Int. Cl.
  *G06F 30/3308* (2020.01)
  *G06F 30/3312* (2020.01)
  *G06F 30/337* (2020.01)
  *G06F 30/36* (2020.01)
  *G06F 119/10* (2020.01)
  *G06F 30/33* (2020.01)
  *G06F 111/20* (2020.01)
  *G06F 119/06* (2020.01)
  *G06F 119/12* (2020.01)
  *G06F 119/02* (2020.01)
  *G06F 119/08* (2020.01)
  *G06F 119/18* (2020.01)

(52) U.S. Cl.
  CPC ...... *G06F 2119/10* (2020.01); *G06F 2119/12* (2020.01); *G06F 2119/18* (2020.01)

(56) References Cited

U.S. PATENT DOCUMENTS

| | | | |
|---|---|---|---|
| 6,072,945 A | 6/2000 | Aji et al. | |
| 6,278,964 B1* | 8/2001 | Fang | G01R 31/318328 703/19 |
| 6,470,479 B1 | 10/2002 | Yamamoto | |
| 6,591,402 B1* | 7/2003 | Chandra | G06F 30/367 716/106 |
| 6,629,295 B1 | 9/2003 | Akimoto et al. | |
| 7,313,771 B2 | 12/2007 | Reddy et al. | |
| 8,042,080 B2 | 10/2011 | Hirano | |
| 8,160,858 B2* | 4/2012 | Tseng | G06F 30/367 703/14 |
| 8,713,498 B2* | 4/2014 | Shroff | G06F 30/398 716/111 |
| 8,726,201 B2 | 5/2014 | Bickford et al. | |
| 8,782,577 B2* | 7/2014 | Fischer | G06F 30/39 716/100 |
| 8,938,701 B2* | 1/2015 | Barwin | G06F 30/398 716/104 |
| 9,104,832 B1 | 8/2015 | Barwin, III et al. | |
| 9,330,222 B2* | 5/2016 | White | G06F 30/398 |
| 9,552,455 B2 | 1/2017 | Poindexter et al. | |
| 9,953,122 B2* | 4/2018 | Chang | G06F 30/392 |
| 10,726,174 B2* | 7/2020 | Lin | G01R 31/2856 |
| 2010/0037191 A1 | 2/2010 | Kosuge | |
| 2014/0181780 A1 | 6/2014 | Burd et al. | |
| 2015/0356229 A1 | 12/2015 | Siu et al. | |
| 2017/0351785 A1 | 12/2017 | Dhanwada et al. | |
| 2019/0018920 A1* | 1/2019 | Lin | G06F 30/30 |

OTHER PUBLICATIONS

B. Li et al., "A Case Study of Electromigration Reliability," 2015 IEEE, 6 pages. (Year: 2015).*

L. Yu et al., Statistical Library Characterization Using Belief Propagation across Multiple Technology Nodes, 2015 Design, Automation & Test in Europe Conference & Exhibition (DATE), pp. 1383-1388. (Year: 2015).*

Palkesh Jain, et al., "A Fast and Retargetable Framework for Logic-IP-Internal Electromigration Assessment Comprehending Advanced Waveform Effects", IEEE Transactions on Very Large Scale Integration (VLSI) Systems Year: 2016, vol. 24, Issue: 6, pp. 2345-2358.

Dennard, Robert H., et al. "Design of ion-implanted MOSFET's with very small physical dimensions." IEEE Journal of Solid-State Circuits 9.5 (1974): 256-268. (abstract only pp. 1-2).

Moore, Gordon E. "Cramming more components onto integrated circuits." Proceedings of the IEEE 86.1 (1998): 82-85.

* cited by examiner

**MAX_SLEW Table
100C/100,000 POH
404**

Frequency in GHz

| | 0.1 | 0.3 | 0.6 | 1.3 | 2.6 | 5.2 | 8.0 |
|---|---|---|---|---|---|---|---|
| 0.6 | 1e-9 | | | | | | |
| 0.7 | | | | | | | |
| 0.8 | | | Each Entry Indicates Maximum Allowed Input Slew | | | | |
| 0.9 | | | | | | | |
| 1.0 | | | | | | | |
| 1.1 | | | | | | | |
| 1.2 | | | | | | | -1 |

Voltage in Volts

**MAX_CAP Table
100C/100,000
POH/25 MHz
408**

Input Slew in ps

| | 4 | 20 | 40 | 80 | 160 | 400 | 2K |
|---|---|---|---|---|---|---|---|
| 0.6 | 1e12 | | | | | | |
| 0.7 | | | | | | | |
| 0.8 | | | Each Entry Indicates Maximum Allowed Output Capacitance | | | | |
| 0.9 | | | | | | | |
| 1.0 | | | | | | | |
| 1.1 | | | | | | | |
| 1.2 | | | | | | | -1 |

Voltage in Volts

*FIG. 4*

| | Input Slew in ps | | | | | | |
|---|---|---|---|---|---|---|---|
| | 4 | 20 | 40 | 80 | 160 | 400 | 2K |
| 0.6 | xxx | xxx | xxx | xxx | xxx | xxx | xxx |
| 0.7 | xxx | xxx | xxx | xxx | xxx | xxx | xxx |
| 0.8 | xxx | xxx | xxx | xxx | xxx | xxx | xxx |
| 0.9 | P | xxx | xxx | L | xxx | xxx | xxx |
| 1.0 | xxx | xxx | xxx | xxx | xxx | xxx | xxx |
| 1.1 | xxx | xxx | xxx | xxx | xxx | xxx | xxx |
| 1.2 | xxx | xxx | xxx | xxx | xxx | xxx | xxx |

(rows labeled: Voltage in Volts)

*FIG. 6A*

CHARACTERIZING AND SIMULATING LIBRARY GATES TO ENABLE IDENTIFICATION AND ELIMINATION OF ELECTROMIGRATION VIOLATIONS IN SEMICONDUCTOR CHIPS

BACKGROUND

The present invention relates to the electrical, electronic, and computer arts, and more specifically, to a method for identifying and eliminating electromigration violations of a semiconductor device.

As semiconductor technology scaling evolution continues, three principal trends have emerged. The first trend is an increasing of interconnect current densities, as predicted by Dennard (Dennard, R. H., et al. "Design of Ion-Implanted. MOSFETs with Very Small Physical Dimensions." *IEEE Journal of Solid-State Circuits*, vol. 9, no. 5, 1974, pp. 256-268., doi:10.1109/jssc.1974.1050511). The second trend is the industry migration from a two-dimensional (2D) planar transistor to a three-dimensional (3D) Fin Field-effect (FINFET) transistor. FINFET transistors deliver much higher current per unit area than the planar transistors they often replace. This increases the current densities in the interconnect wires and vias beyond what was predicted by Dennard. The third trend is a doubling of the circuit count with each technology round as predicted by Moore (Moore, G. E. "Cramming More Components Onto integrated Circuits," *Proceedings of the IEEE*, vol. 86, no. 1, 1998, pp. 82-85., doi:10.1109/jproc.1998.658762), while meeting constant or increasing lifetime requirements.

SUMMARY

Principles of the invention provide techniques for characterizing and simulating library gates to enable the identification and elimination of electromigration violations of a semiconductor device. In one aspect, an exemplary method includes the step of obtaining a set of library gates; performing parasitic layout extraction for each gate in the set of library gates to generate an extracted netlist; and performing one or more passes of an electromigration analysis of the extracted netlist to characterize each gate over a set of input parameters and to generate a maximum slew rate (MAX_SLEW) table and a maximum capacitance (MAX_CAP) table.

In one aspect, an exemplary method includes the step of examining each instance of a plurality of instances of a design constructed from a set of library gates; determining one or more relevant input parameters for one of the instances; selecting appropriate entries in a maximum slew rate (MAX_SLEW) table and a maximum capacitance (MAX_CAP) table; verifying that an input slew rate of the instance is less than a MAX_SLEW rate and that an output capacitance of the instance is less than a MAX_CAP value; and reporting any electromigration violations.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

a method for creating "correct by construction" gate level designs, identifying places where electromigration violations arise, and eliminating these violations in the construction phase;

support for semiconductor circuit designs featuring multi-billions of gates;

improving the performance of a computer running an Electronic Design Automation (EDA) through the use of slew and capacitance tables;

generating instructions for manufacturing a semiconductor device in accordance with the design;

characterizing input slew rates and other internal nodes in gates;

characterizing cells with maximum slew rate and maximum capacitance tables, enabling optimization tools to adjust when electromigration violations are identified;

a method applicable to sign off flow, whereby an IP core (an intellectual property core wherein a block of logic or data is reused in making a field programmable gate array (FPGA), an application-specific integrated circuit (ASIC), or the like) provided by third parties can be validated for electromigration robustness; and designing integrated circuits with longer service life than circuits designed without aspects of the invention, due to reduced potential for electromigration failure.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 illustrates an example maximum slew rate (MAX_SLEW) table and an example maximum capacitance (MAX_CAP) table, in accordance with an example embodiment;

FIG. 6A illustrates a second example MAX_CAP table, in accordance with an example embodiment;

DETAILED DESCRIPTION

As described above, the first trend of the semiconductor technology scaling evolution is an increasing of interconnect current densities. It is becoming more difficult, however, to keep these current densities below the safe limits designated by technology manufacturers. In places where current densities exceed safe limits, electromigration (EM) failures often occur. These failures manifest themselves as mass redistributions that cause opens in, or shorts between, interconnect wires, vias, and the like. Moreover, the second trend of an industry migration from a 2D planar transistor to a 3D FINFET transistor and the much higher current per unit area that such FINFETs deliver increases the current densities in the interconnect wires and vias beyond what was predicted by Dennard. Finally, the doubling of the circuit count with each technology round results in designers encountering an ever-increasing number of electromigration failures.

Typical electronic design automation (EDA) tools for electromigration analysis attempt to analyze the entire design at the transistor level after the design has been completed. This has several shortcomings. First, the tools do not offer help to designers in creating "correct by construction" designs. Second, these tools are unable to analyze an entire chip at the transistor level. Instead, a chip design must be split into multiple pieces where each piece is analyzed separately. Finally, the tools do not address gate level design flows. Gate level design flows support larger designs and faster construction flows because they "hide" transistors (and associated interconnects) from detailed, time and memory intensive analysis. Nevertheless, electromigration robustness should be provided in such semiconductor designs.

Figure 1:
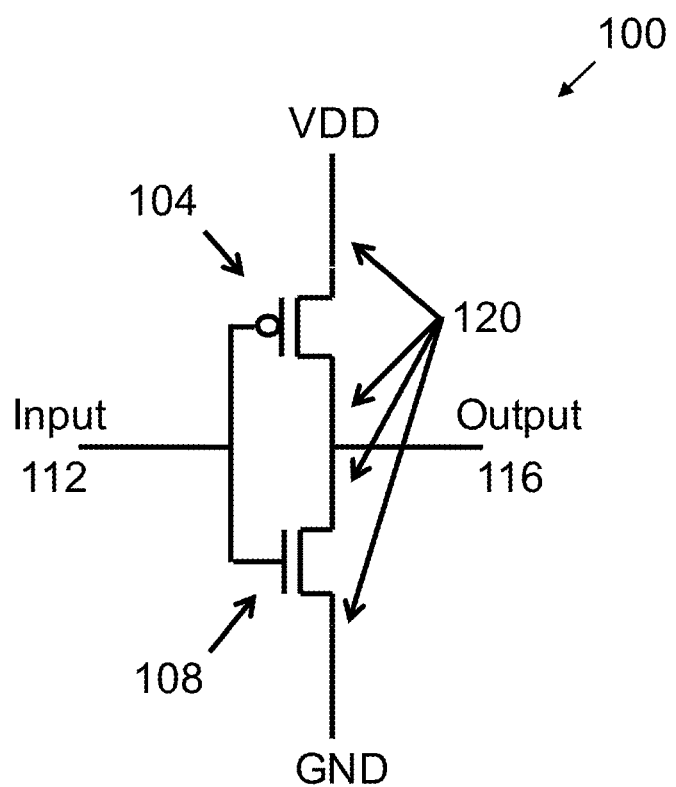
FIG. 1 illustrates a portion of a very large-scale integrated (VLSI) circuit, that can be analyzed in accordance with an example embodiment.

FIG. 1 illustrates a portion of a very large-scale integrated (VLSI) circuit 100, that can be analyzed in accordance with an example embodiment. The VLSI circuit 100 comprises one or more p-type metal-oxide-semiconductor (PMOS) transistors 104, one or more n-type metal-oxide-semiconductor (NMOS) transistors 108, one or more circuit inputs 112, and one or more circuit outputs 116. The transistors are connected by interconnect wires 120 that are susceptible to electromigration failures if, for example, current densities are above safe technology limits.

In principal, there are two main current contributors. The first contributor is a capacitive load on each circuit output 116. In general, a larger capacitance increases current. The second contributor is cross over current due to the speed of the voltage transition from one voltage level to another voltage level of the circuit inputs 112. This transition speed is called "slew" and is characterized by a slew rate. A slower transition (that is, a larger slew) increases current. It should be mentioned that gate tunneling current and off leakage currents also contribute to currents in the interconnect wires 120. While the latter components are significant at the chip level, they are typically minor contributors at the individual circuit level and their inclusion into characterization is optional.

Figure 2:
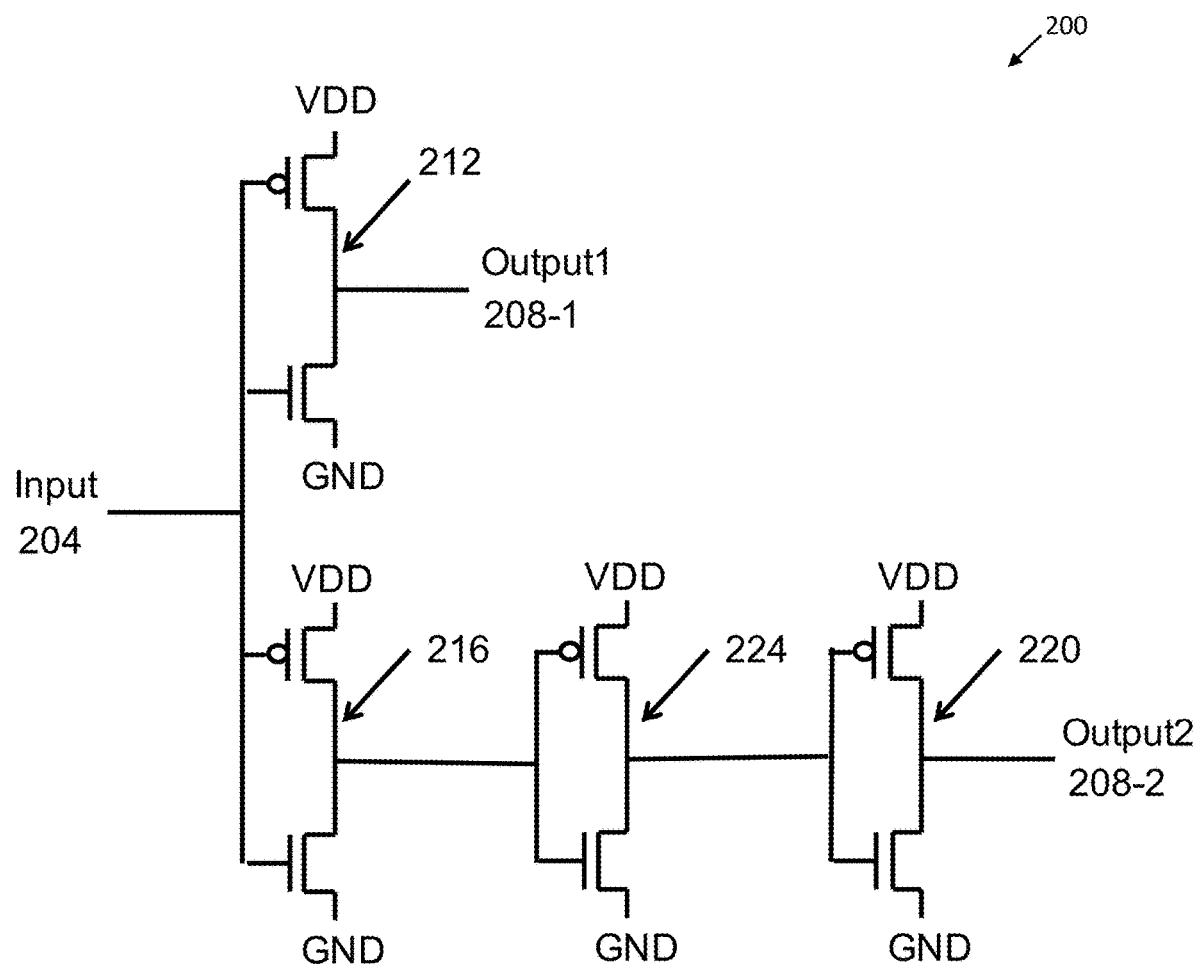
FIG. 2 illustrates a gate used in gate level designs, that can be analyzed in accordance with an example embodiment.

FIG. 2 illustrates a gate 200 used in gate level designs, that can be analyzed in accordance with an example embodiment. (Note that gate and circuit are used interchangeably herein.) The gate 200 has one external input 204 and two external outputs 208-1 and 208-2. In the example gate 200, it is observed that:

Current of interconnect 212 depends on the slew rate of external input 204 and the load on the external output 208-1;

Current of interconnect 216 depends on the slew rate of external input 204;

Current of interconnect 220 depends on the load on the external output 208-2;

Current of interconnect 224 does not depend on either an external input slew rate or an external output load.

In addition to input slew and output load, the currents above are also influenced by voltage and frequency. Once the slew, capacitance, voltage, and frequency parameters are set, a given circuit can be simulated to determine currents in all internal wire segments (interconnects) and vias. These currents are compared against safe wire and via limits. Safe limits are based on interconnect features such as chemistry and geometry (the latter partially specified in the gate layout) and application conditions such as power-on-hours (POH) lifetime, temperature, and the like.

Generally, a method for identifying and eliminating electromigration violations in semiconductor designs is disclosed. The method is operable with a variety of EDA tools, such as (a non-limiting example) the Electromigration/IR (EMIR) Drop tool by Cadence Design Systems, Inc. of San Jose, Calif. For each gate in a semiconductor library, a maximum slew (MAX_SLEW) table and a maximum capacitance (MAX_CAP) table are generated. The tables span a range of, for example, the following four independent parameters: voltage, frequency, temperature, and POH. Each entry in the MAX_SLEW table indicates a maximum allowable slew rate on gate inputs for a particular set of parameters. Each entry in the MAX_CAP table indicates a maximum allowable capacitance on gate outputs for a particular set of parameters. Exceeding values of either table will create electromigration violations internal to the gate.

During gate level design construction, or during the design sign off stage of the construction process, the method queries, for example, the voltage, frequency, temperature, and POH parameters of each gate instance. Because the same gate in the library will be used multiple times on multiple chips, each instance usage may have unique values for these parameters. An instance that drives clock nets will switch more frequently, for example, than an instance that drives signal nets. An instance in the processor central processing unit (CPU) may run at a higher voltage, for example, than an instance of the same gate in the input/output (I/O) region of the semiconductor device. Once parameter values are known, the MAX_SLEW table is indexed to look up the maximum allowable input slew rate. A check is then performed to make sure the actual SLEW rate is less than the MAX_SLEW rate. If the actual SLEW rate is less than or equal to the MAX_SLEW rate, there are no electromigration violations internal to the gate resulting from the slew rate. If the actual SLEW rate is greater than the MAX_SLEW rate, the design can be re-optimized for this specific instance and the SLEW rate can be reduced accordingly.

Similarly, once the cited parameter values are known, the MAX_CAP table is indexed to look up the maximum allowable output capacitance. A check is then performed to make sure the actual CAP value is less than the MAX_CAP value. If the actual CAP value is less than or equal to the MAX_CAP value, there are no electromigration violations internal to the gate resulting from the capacitance value. If the actual CAP value is greater than the MAX_CAP value, the design can be re-optimized for this specific instance and the CAP value can be reduced accordingly.

Figure 3:
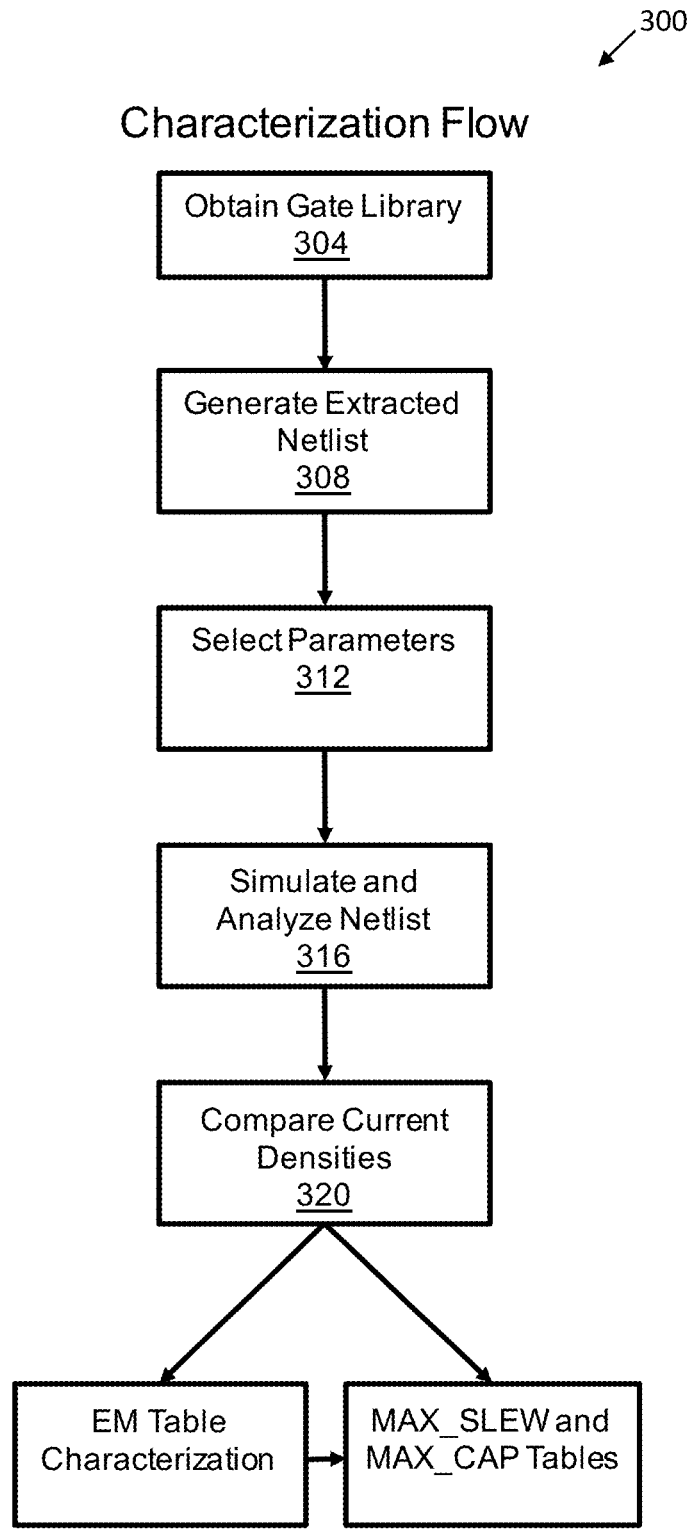
FIG. 3 illustrates an example workflow for characterizing library gates in a semiconductor design, in accordance with an example embodiment.

FIG. 3 illustrates an example workflow 300 for characterizing library gates in a semiconductor design, in accordance with an example embodiment. The workflow 300 serves to characterize the gates in a library for electromigration (EM) sensitivities and generate the MAX_SLEW and MAX_CAP tables. Each gate in the gate library is obtained (operation 304) and each gate layout is extracted to generate an extracted netlist (operation 308). In one example embodiment, the extracted netlist is generated by a commercial or proprietary tool, as will in itself be familiar to the skilled artisan. In one example embodiment, a user, such as a VLSI designer, selects which parameters remain fixed (and do not need to be characterized), and which parameters will vary and be characterized (operation 312). The netlist is analyzed by a simulator and EM analysis tool to determine the interconnect current densities (operation 316), and the interconnect current densities are compared against specified safe limits, to create the entries for the MAX_SLEW and MAX_CAP tables over a range of independent parameters (operation 320). In one example embodiment, the simulation is performed by a commercial or proprietary circuit simulator and EM analysis tool, as will in itself be familiar to the skilled artisan. The safe limits may be specified by the manufacturer(s) of the semiconductor device. The EM table characterization finishes and the MAX_SLEW and MAX_CAP tables are created. Given the teachings herein, and general principles of circuit design, a user, such as a VLSI designer, will be able to select which parameters remain fixed (and do not need to be characterized), and which parameters will vary and be characterized (operation 312). For the MAX_SLEW table, the possible parameters are, for example, voltage, frequency, temperature, and POH.

FIG. 4 illustrates an example MAX_SLEW table 404 and an example MAX_CAP table 408, in accordance with an example embodiment. Two parameters in the MAX_SLEW table are voltage and frequency. A MAX_SLEW table is generated, for example, for each temperature/POH combination that is desired (100° C./100,000 POH in this example). An entry of 1e-9 indicates that the maximum allowable input slew is 1 ns at 0.6 V and 0.1 GHz. An entry of −1 at 1.2 V and 8 GHz indicates there is no valid slew rate, which means this instance cannot be safely used with this application condition at any input slew rate, no matter how small it may be. (To avoid illustrative clutter, each box in the MAX_SLEW table 404 is not populated for the example.)

Several methods can be used to generate an entry in the MAX_SLEW table. In one example embodiment, the parameters are set as follows (using the example of FIG. 4): 100° C., 100,000 POH, 0.6 V, 0.1 GHz. The capacitance on all outputs is set to zero. The circuit is simulated by switching inputs at ever increasing slew rates, and approximating techniques are used to predict a slew rate at which a safe limit will be close (e.g., within a tolerance selected by the skilled artisan) to being violated anywhere in the circuit. When the EM tool indicates that a violation of the safe current density limit is near in any one of the metal (interconnect) or via segments (anywhere in the circuit), the corresponding simulation slew rate is recorded as the entry in the MAX_SLEW table for the condition(s) selected. However, if the safe limit is violated even at the minimum allowed slew rate, a value of −1 is entered into the MAX_SLEW table.

For the MAX_CAP table, the possible parameters are, for example, input slew rate, voltage, frequency, temperature, and POH. Two parameters in the table are voltage and input slew rate. A MAX_CAP table is generated, for example, for each temperature/POH/frequency combination that is desired (100° C./100,000 POH/25 MHz in this example). An entry of 1e12 indicates that the maximum allowable output capacitance is 1 pF at 0.6 V and 4 ps. An entry of −1 at 1.2 V and 2,000 ps indicates there is no valid capacitance, which means this instance cannot be safely used at this application condition at any output capacitance, no matter how small it may be (even zero). (To avoid illustrative clutter, each box in the MAX_CAP table 408 is not populated for the example.)

Several methods can be used to generate an entry in the MAX_CAP table. In one example embodiment, these parameters are set as follows (using the example of FIG. 4): 100° C., 100,000 POH, 25 MHz, 0.6 V, 4 ps. The circuit is simulated by switching outputs at ever increasing capacitances, and approximating techniques are used to predict a capacitance at which the safe limit will be close to being violated anywhere in the circuit output. When the EM tool indicates that a violation of the safe current density limit is near in any one of the metal (interconnect) or via segments anywhere in the circuit output, the corresponding simulation capacitance is recorded as the entry in the MAX_CAP table for the condition(s) selected. However, if the safe limit is violated even at zero output capacitance, a value of −1 is entered into the MAX_CAP table.

In one or more embodiments, it is advisable to make sure that all nodes are logically switched ("up" and "down") when a gate is characterized to make sure that every part of the circuit is checked for electromigration. This entails transitioning all nodes for all possible circuit states. In addition, users can choose whether each input signal should have its own MAX_SLEW table, or if a single MAX_SLEW table is to be used to cover all input signals. The former method is less conservative; however, it requires more tables. Gates with multiple outputs (such as shown in FIG. 2) require a separate MAX_CAP table for each output, in one or more embodiments.

The ranges for frequency/voltage in the MAX_SLEW table 404 and the slew/voltage in the MAX_CAP table 408 are examples. In one example embodiment, designers choose appropriate ranges required to cover all applications and choose the number of rows and columns in each table. Finally, designers can choose which parameters make up the rows and columns of the tables, and which parameters are used to create multiple tables. For example, the parameters can be selected to cover all anticipated applications.

Once a library has been characterized, the EM tables can be used for many different chips to quickly validate the EM robustness by making sure that the input slew rates are not great enough to violate safe limits and that the gate outputs are not overloaded.

Figure 5A:
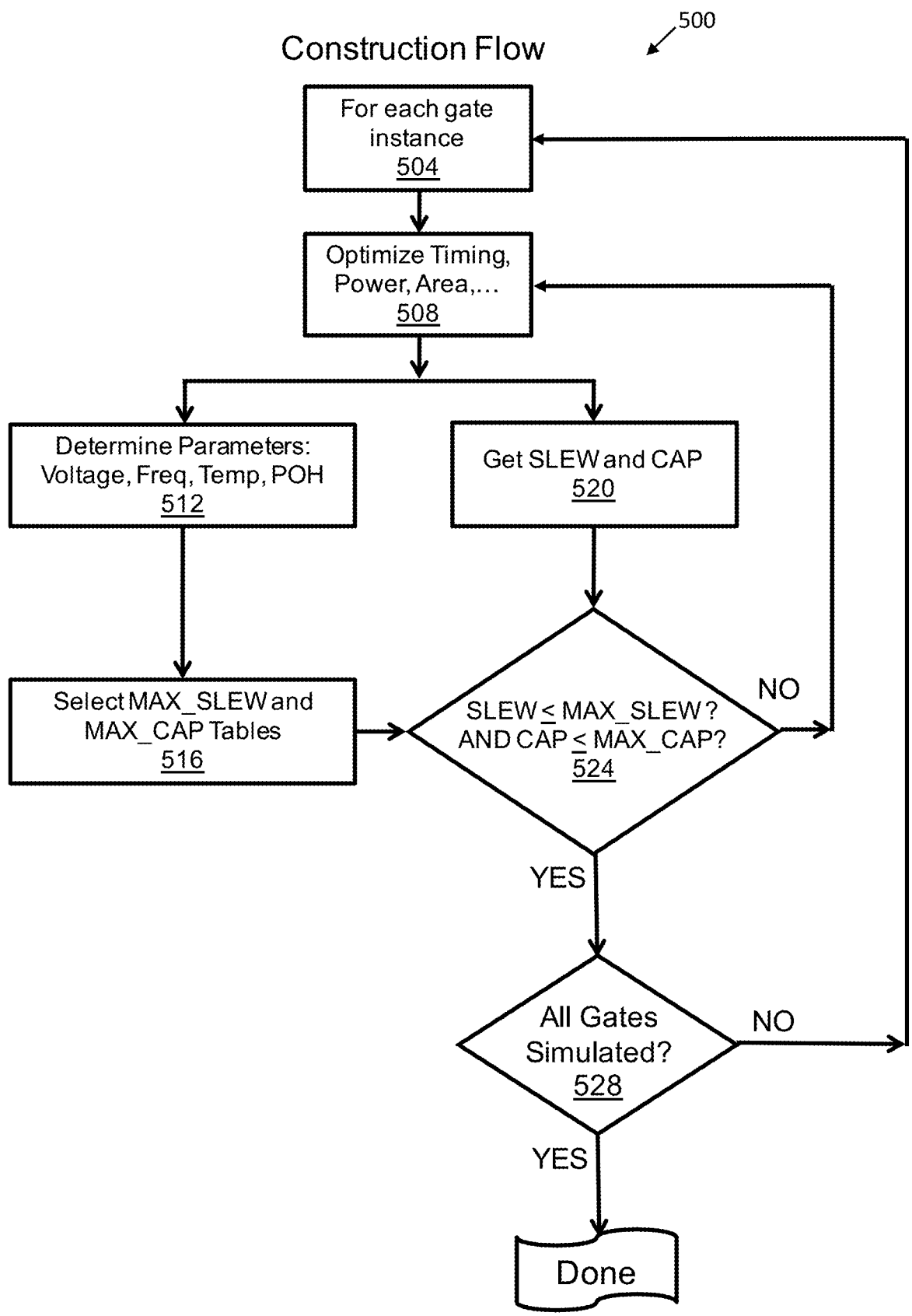
FIG. 5A illustrates a method for identifying electromigration violations in a construction phase of a semiconductor design, in accordance with an example embodiment.

FIG. 5A illustrates a method 500 for identifying electromigration violations in a construction phase of a semiconductor design, in accordance with an example embodiment. During the construction flow, a gate instance is selected (operation 504) and the gate instance is optimized based on any number of optimization criteria (operation 508). The optimization criteria are, for example, timing, power, area, and the like. As part of the construction flow, the voltage, frequency, temperature, and POH, and the input slew and output capacitance are queried for the selected gate instance (operations 512 and 520, respectively).

These parameters are used to select the appropriate tables, as well as the appropriate rows/columns, in the MAX_SLEW and MAX_CAP tables (operation 516). Next, a check is made to ensure that the slew rate on input(s) is less than the value in the MAX_SLEW table and a check is made to ensure that the capacitance on the output(s) is less than the value in the MAX_CAP table (operation 524). If both the slew rate and capacitance are below their respective maximum limits, construction flow is complete for the selected gate and the method 500 proceeds to decision block 528. If either the slew rate or the capacitance (or both) exceeds the maximum limit from the respective EM table, the method 500 proceeds with operation 508 and the instance failing the safe limit(s) is re-optimized to reduce the slew rate and/or the capacitance.

In decision block 528, a check is performed to determine if all gates have been processed. If all gates have not been processed, the method 500 proceeds with operation 504 to process the next gate in the library. If all gates have been processed, the method 500 ends.

Figure 5B:
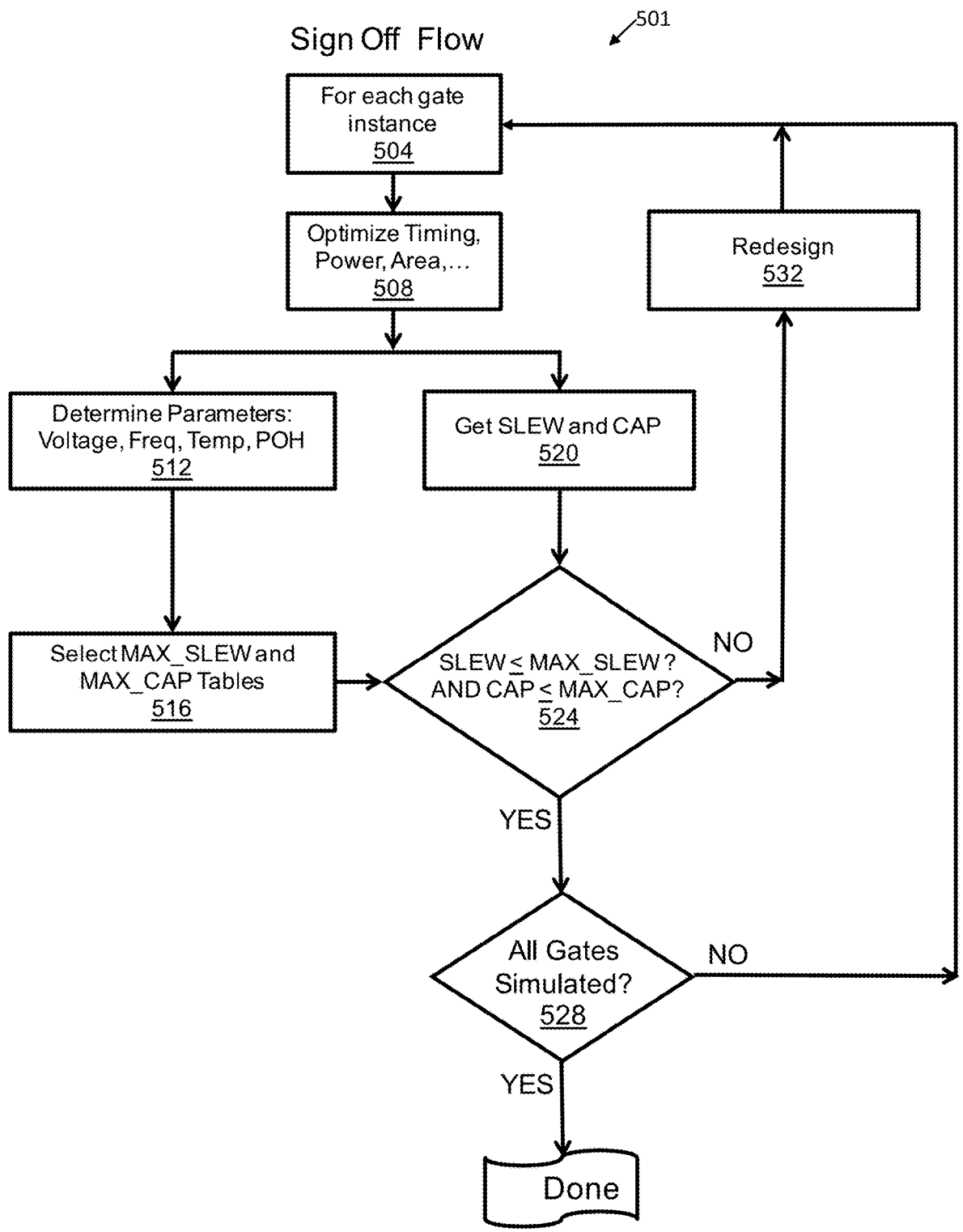
FIG. 5B illustrates a method for identifying electromigration violations in a sign off phase of a semiconductor design, in accordance with an example embodiment.

FIG. 5B illustrates a method 501 for identifying electromigration violations in a sign off phase of a semiconductor design, in accordance with an example embodiment. Similar steps are followed for the sign off phase as in the construction phase, such as may happen with a third-party IP provider. All the steps are the same (and therefore will not be described again) except for the redesign operation 532; if either the slew rate or the capacitance (or both) exceeds the maximum limit from the respective EM table, the design is re-designed at 532. Note, however, that operation 508 is optional in this context. For example, where the sign-off relates to a design from a third party, operation 508 may be skipped and if a fail is detected, need for a redesign is flagged in step 532—instead of iterative redesign by the signing-off party, the third party can then undertake the redesign.

When looking up entries in the MAX_SLEW and MAX_CAP tables, the values of indexes for frequency, voltage, and slew rate may not exactly match the entries in the rows and columns of the tables. In such a case, the MAX_CAP and MAX_SLEW values are interpolated; given the teachings herein, the skilled artisan will be able to select suitable interpolation techniques from among those widely known in the industry.

It is instructive to take another look at the gate of FIGS. 1 and 2. As discussed above in conjunction with FIG. 1, current in every metal (interconnect) and via segment depends, for example, on output capacitance and input slew rate. In some cases, the slew rate is variable. This is the case of input 204 in FIG. 2. On the other hand, the slew rates on nodes 216 and 224 are fixed and are based on the internal structure of the circuit. Similarly, in some cases, the output capacitance is variable. This is the case for the external outputs (nodes) 208-1 and 208-2. On the other hand, the capacitances on nodes 216 and 224 are fixed and are based on the internal structure of the circuit. All interconnects in the circuit of FIG. 2 are checked as follows using the MAX_CAP and MAX_SLEW tables. Interconnect 212 will be checked via the MAX_CAP table. Note that the MAX_SLEW table will also be used; however, it is really not required in one or more embodiments because it checks to a relaxed slew criterion. This is due to the fact that the characterization was done with all output capacitances set to zero. This is true of all single stage gates, in one or more embodiments.

Interconnect 216 will be checked via the MAX_SLEW table. It is insensitive to output capacitances. Interconnect 220 will be checked via the MAX_CAP table. It is insensitive to input slew. Interconnect 224 will be checked via the MAX_SLEW table. While this node has no sensitivity to either the input slews of the gate or the output capacitance of the gate, it is sensitive to internal slews and capacitances. Since MAX_SLEW characterization checks current density in all metal and via segments, it is possible that, at certain voltage/frequency/temperature/POH conditions, interconnect 224 will exceed the safe limit irrespective of the slew rate of the external input 204 or the capacitance of the external output 208-2.

Thus far, the discussion has focused on metal and via current density and electromigration (EM). Larger input slews lead to larger cross over current and larger current densities. Another interconnect failure mechanism is Joule heating. Joule heating worsens as slew rates decrease, especially on wires that have bi-directional currents. It is possible to capture Joule heating into a characterization as follows. For every entry in the MAX_SLEW table, perform one extra simulation at the fastest possible input slew rate. Let the EM tool verify that there are no Joule heating violations. If there are no Joule heating violations, enter the maximum allowable slew rate to keep the current density below safe limits (as described above). If Joule heating fails, enter −1.

As was described above, the MAX_CAP table depends, for example, on the following parameters: input slew rate, voltage, frequency, temperature, and POH. In one or more embodiments, the MAX_CAP table should be characterized for all these parameters; however, the following simplification can be made in one or more instances. Capacitance is inversely proportional to frequency via the following equation: $C=I/VF$, where C is the capacitance, I is the current, V is the voltage, and F is the frequency. Thus, if MAX_CAP was 1 pF at 25 MHz, it will be ½ pF at 50 MHz. This means that the MAX_CAP table can be constructed at a single frequency, and then scaled to the actual frequency. FIG. 6A illustrates a second example MAX_CAP table, in accordance with an example embodiment. Since the MAX_CAP value also has input slew dependency in the table, the following procedure can be used.

Figure 6B:
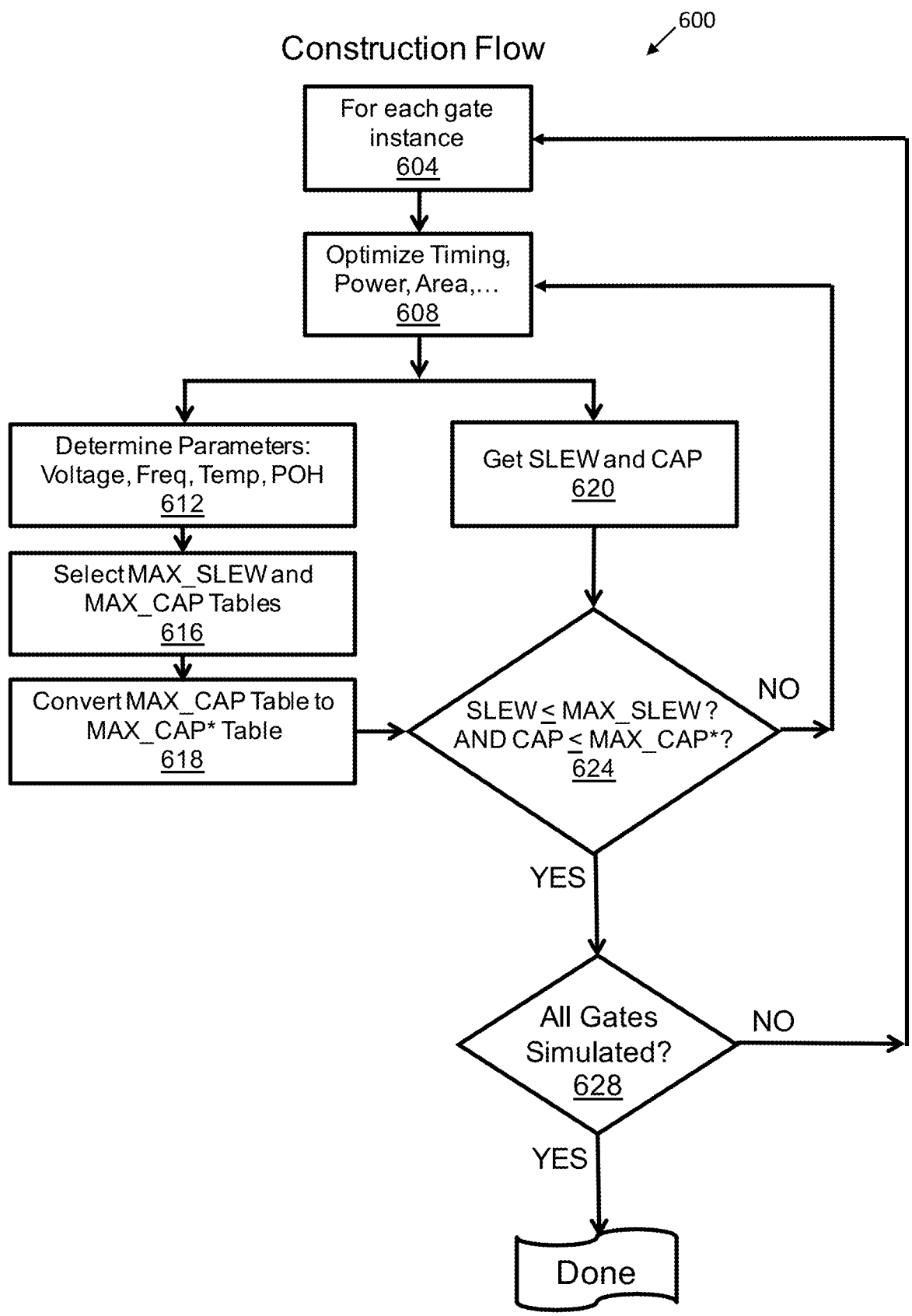
FIG. 6B illustrates a second method for identifying electromigration violations in a construction phase of a semiconductor designs, in accordance with an example embodiment.
Figure 6C:
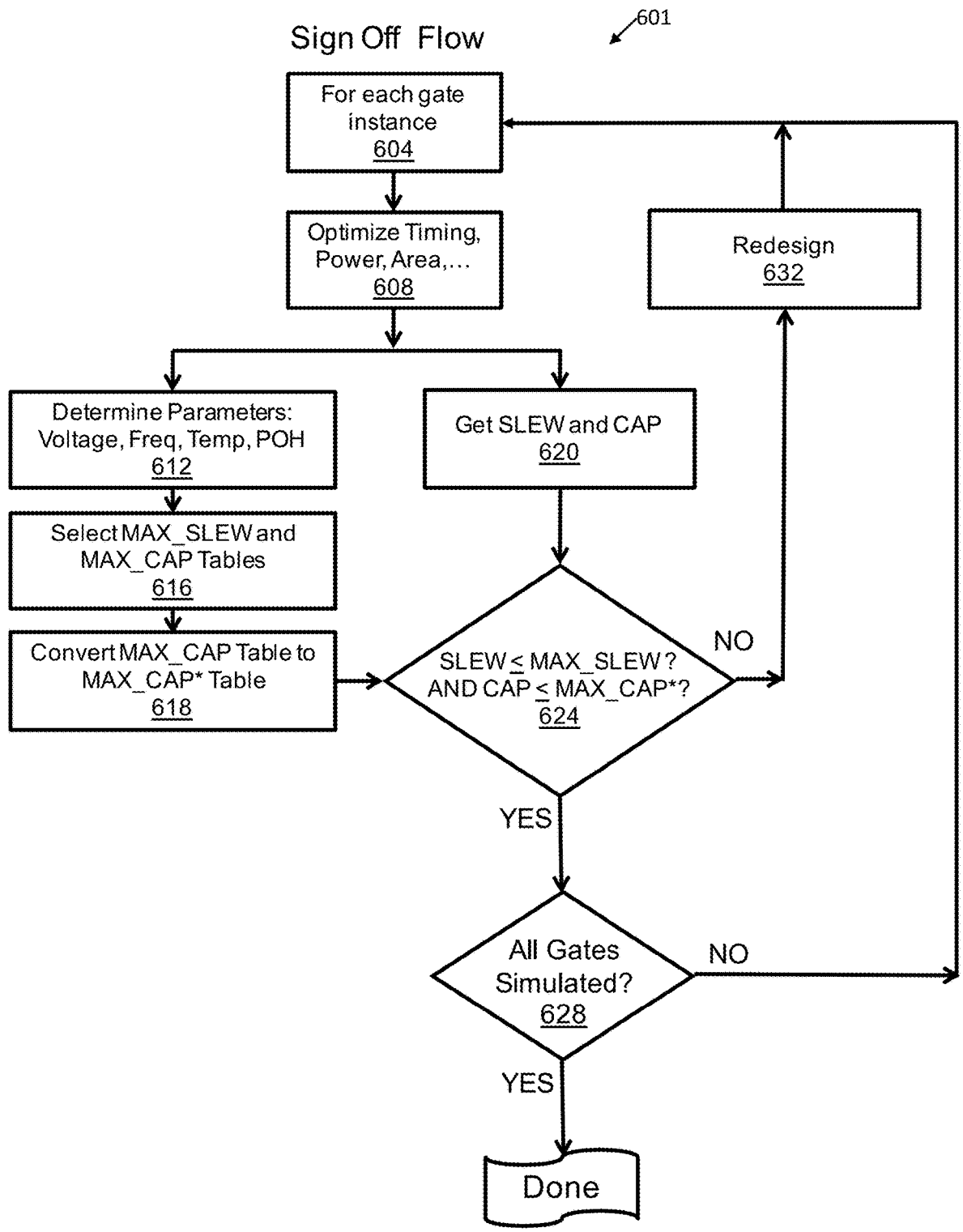
FIG. 6C illustrates a second method for identifying electromigration violations in a sign off phase of a semiconductor design, in accordance with an example embodiment.

FIG. 6B illustrates a second method 600 for identifying electromigration violations in a construction phase of a semiconductor design, in accordance with an example embodiment. FIG. 6C illustrates a second method 601 for identifying electromigration violations in a sign off phase of a semiconductor design. Operations 604, 608, 612, 616, 620, 624, 628, 632 are generally analogous to operations 504, 508, 512, 516, 520, 524, 528, 532 (i.e., methods 600 and 601 are similar to methods 500 and 501, respectively), except the MAX_CAP table is converted to the MAX_CAP* table (operation 618) and the comparison operation 624 utilizes MAX_CAP* instead of MAX_CAP. For example, assume the MAX_CAP value at 25 MHz, 0.9 V, and 80 ps is L. MAX_CAP* is determined for frequency F, 0.9 V, and 80 ps, where F is the new frequency in MHz. Let:

P be MAX_CAP value at 25 MHz, 0.9 V and 4 ps (minimum slew)
M=1/P
B=1−L*M
SCALE=F/25
MAX_CAP*=(1−SCALE*B)/(SCALE*M)

In one example embodiment, the techniques described in Dhanwada, Nagashyamala R., et al., "Early Analysis and Mitigation of Self-Heating in Design Flows," US Patent Publication 2017-0351785, Dec. 7, 2017, precede the electromigration analysis using the EM Tables. One simple way to use the EM tables as illustrated in FIG. 4 is to generate a single MAX_SLEW table and a single MAX_CAP table per chip at a given temperature and POH. This assumes that all gates on a given chip operate at the same temperature. This assumption is not always correct, and may in some instances possibly lead to designs that are either over-designed and non-optimal, or optimistic and unreliable. Gates that have high switching factors, large load capacitances, and slow input slew rates will consume more power and run hotter. A better way to use the EM tables in one or more embodiments is to generate the MAX_SLEW and MAX_CAP tables for a range of temperatures. For example, the EM tables can be generated at 100° C., 101° C., 102° C., and so on up to some maximum temperature at which the chip is allowed to operate. Then, before operation 512 of FIG. 5A is executed, the temperature of each individual instance of a gate is determined via the technique described above. In operation 512, the EM tables will be selected based on the temperature of a given gate instance. This will ensure that the temperature of each individual gate instance is taken into account when the EM table checks are performed for that particular gate instance.

Given the discussion thus far, it will be appreciated that, in general terms, an exemplary method for improving performance of a computer in identifying and mitigating electromigration violations of a semiconductor device, according to an aspect of the invention, includes the operations of obtaining a set of library gates; performing parasitic layout extraction for each gate in the set of library gates to generate an extracted netlist; and performing one or more passes of an electromigration analysis of the extracted netlist to characterize each gate over a set of input parameters and to generate a maximum slew rate (MAX_SLEW) table and a maximum capacitance (MAX_CAP) table.

In one example embodiment, the set of input parameters are any of a voltage, a frequency, an input slew, a temperature, and power on hours. In one example embodiment, the MAX_SLEW table specifies a maximum allowable slew rate at a gate input such that there are no electromigration violations in the gate for the selected set of input parameters. In one example embodiment, which table parameters to use for rows and columns of the MAX_SLEW table, which multiple table parameters to use to create multiple tables, a range of each of the set of input parameters, a number of rows and a number of columns in each table are user selectable.

In one example embodiment, the MAX_CAP table specifies a maximum allowable capacitance at a gate output such that there are no electromigration violations in the gate for the selected set of input parameters. In one example embodiment, which table parameters to use for rows and columns of the MAX_CAP table, which multiple table parameters to use to create multiple tables, a range of each of the set of input parameters, a number of rows and a number of columns in each table are user selectable.

In one example embodiment, a characterization finds a maximum allowable input slew rate or a maximum allowable output capacitance by performing the one or more passes of the electromigration analysis with an increasing input slew rate and an increasing output capacitance until an electromigration violation is encountered, or by interpolating results with a subset of simulations. In one example embodiment, an optional analysis is performed with a fastest possible input slew rate that is in a specified design, the optional analysis performed to assure that a Joule heating specification is not violated. In one example embodiment, the MAX_SLEW table can apply to all inputs of a gate collectively, or to one or more of a set of inputs. In one example embodiment, the MAX_SLEW and MAX_CAP tables are generated for a range of temperatures, power on hours, or both.

Given the discussion thus far, it will be appreciated that, in general terms, an exemplary method for identifying electromigration violations in a semiconductor design, according to an aspect of the invention, includes the operations of examining each instance of a plurality of instances of a design constructed from a set of library gates; determining one or more relevant input parameters for one of the instances; selecting appropriate entries in a maximum slew rate (MAX_SLEW) table and a maximum capacitance (MAX_CAP) table; verifying that an input slew rate of the instance is less than a MAX_SLEW rate and that an output capacitance of the instance is less than a MAX_CAP value to improve performance of a computer running an electronic design automation (EDA) analysis; and reporting any electromigration violations.

In one example embodiment, the operations further comprise re-optimizing the instance by reducing a slew rate on instance inputs and/or reducing a capacitance on the instance output in response to a report of an electromigration violation. In one example embodiment, a set of input parameters are any of a voltage, a frequency, an input slew, a temperature, and a power on hours. In one example embodiment, the operations further comprise interpolating a table entry in response to a corresponding parameter not matching a parameter values in a table row and/or a table column.

In one example embodiment, the operations further comprise scaling one or more values in the MAX_CAP table with frequency to eliminate a need for generating a plurality of MAX_CAP tables at different frequencies. In one example embodiment, the operations further comprise determining a temperature of each individual instance of a gate and the MAX_SLEW table and the MAX_CAP table are selected from a plurality of tables based on a temperature of a given gate instance. In one example embodiment, the operations further comprise determining that no electromigration violations occur, and, responsive thereto, fabricating a physical integrated circuit in accordance with the design.

Given the discussion thus far, it will be appreciated that, in general terms, an exemplary non-transitory computer readable medium comprising computer executable instructions which when executed by a computer cause the computer to perform the method of obtaining a set of library gates; performing parasitic layout extraction for each gate in the set of library gates to generate an extracted netlist; and performing one or more passes of an electromigration analysis of the extracted netlist to characterize each gate over a set of input parameters and to generate a maximum slew rate table and a maximum capacitance table.

In one or more embodiments, a further step includes fabricating a physical integrated circuit in accordance with the analyzed design. One non-limiting specific example of accomplishing this is described elsewhere herein in connection with FIGS. 7-9. For example, a design structure, based on the analyzed design, is provided to fabrication equipment to facilitate fabrication of a physical integrated circuit in accordance with the design structure.

In one or more embodiments, a layout is prepared based on the analysis.

In one or more embodiments, the layout is instantiated as a design structure.

In one or more embodiments, a physical integrated circuit is fabricated in accordance with the design structure.

As noted, in one or more embodiments, the layout is instantiated as a design structure. See discussion of FIG. 7. A physical integrated circuit is then fabricated in accordance with the design structure. See again discussion of FIG. 7. Refer also to FIG. 8. Once the physical design data is obtained, based, in part, on the analytical processes described herein, an integrated circuit designed in accordance therewith can be fabricated according to known processes that are generally described with reference to FIG. 8. Generally, a wafer with multiple copies of the final design is fabricated and cut (i.e., diced) such that each die is one copy of the integrated circuit. At block 810, the processes include fabricating masks for lithography based on the finalized physical layout. At block 820, fabricating the wafer includes using the masks to perform photolithography and etching. Once the wafer is diced, testing and sorting each die is performed at 830 to filter out any faulty die.

Figure 10:
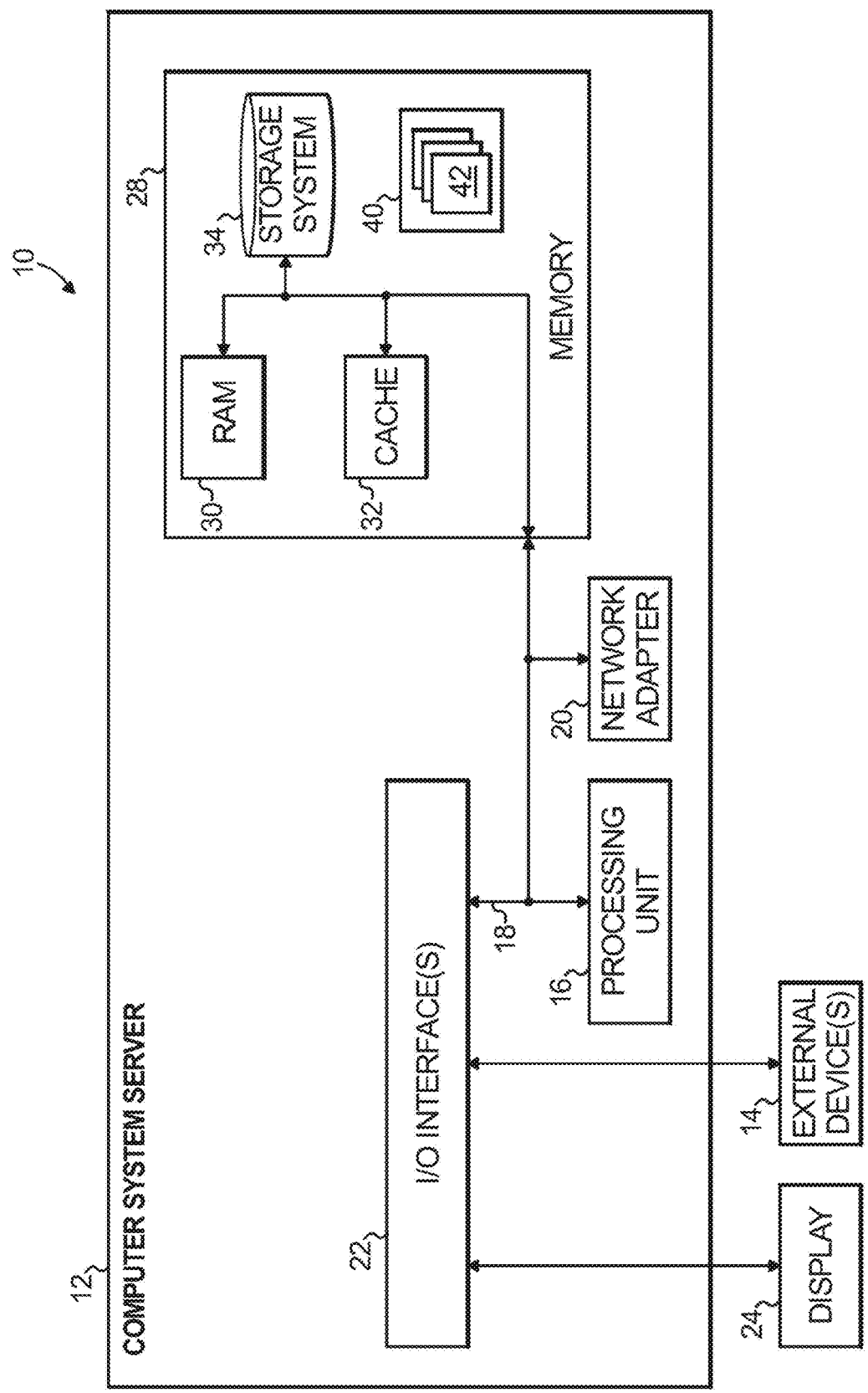
FIG. 10 depicts a computer system that may be useful in implementing one or more aspects and/or elements of the invention.

One or more embodiments include a computer including a memory 28; and at least one processor 16, coupled to the memory, and operative to carry out or otherwise facilitate any one, some, or all of the method steps described herein (as depicted in FIG. 10). In one or more embodiments, the performance (speed) of this computer is improved, for example, by verifying EM robustness and/or creating correct by construction designs using table lookups instead of, for example, re-running an EM analysis for each library gate.

Figure 7:
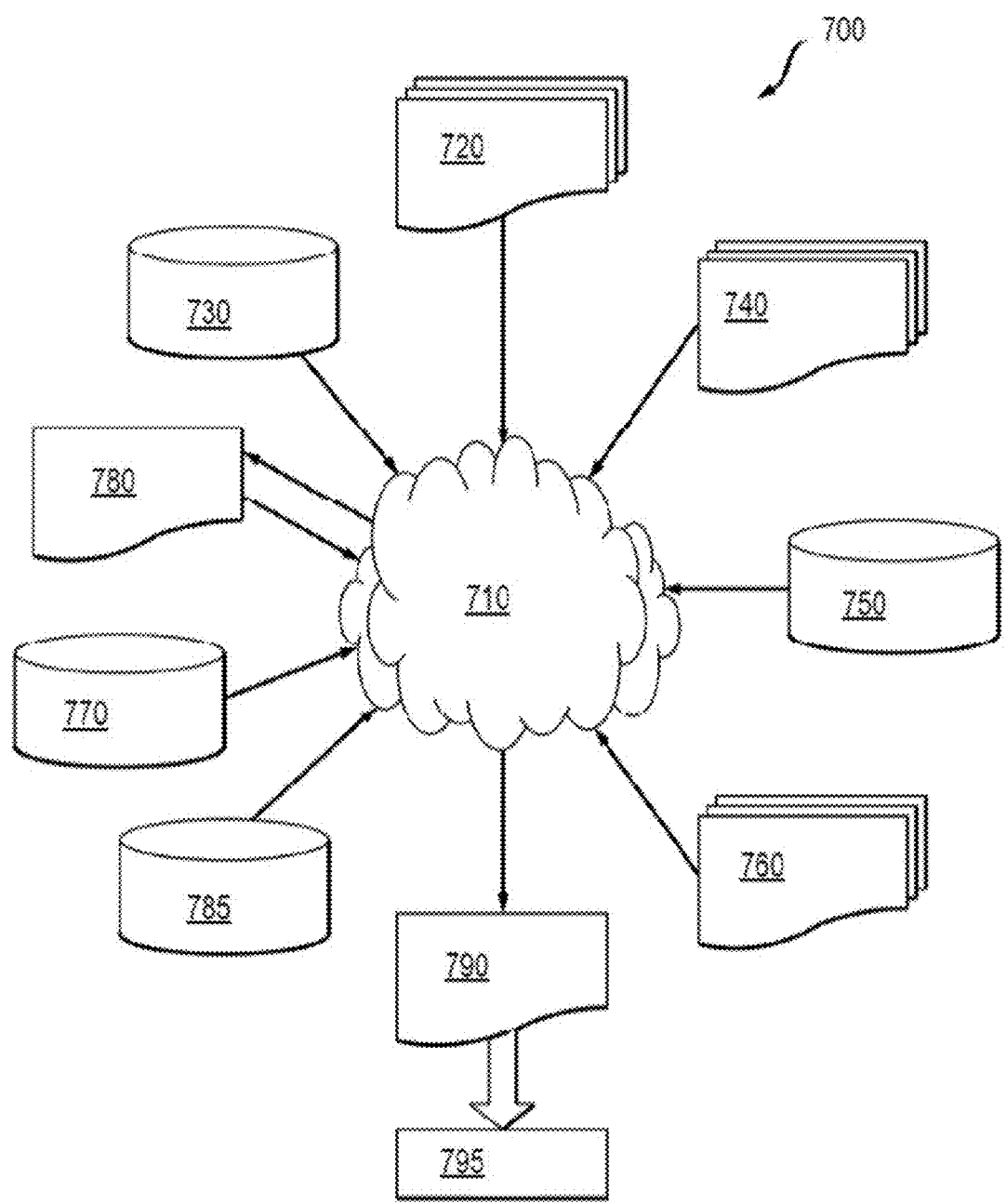
FIG. 7 is a flow diagram of a design process used in semiconductor design, manufacture, and/or test.
Figure 8:
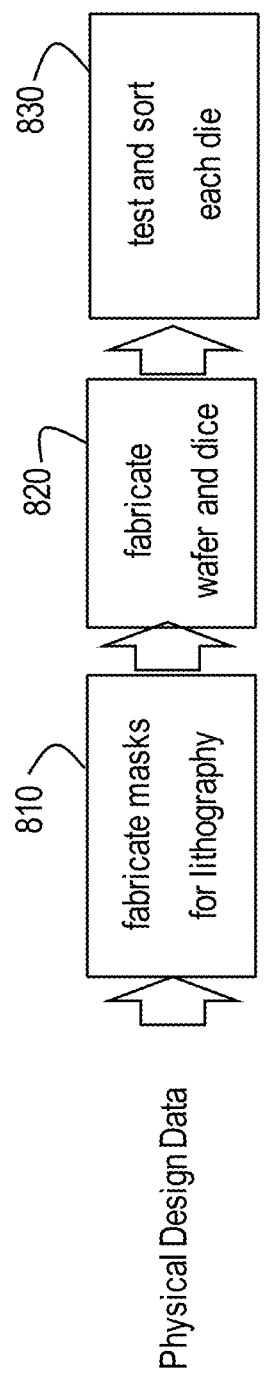
FIG. 8 shows further aspects of IC fabrication from physical design data.

Furthermore, referring to FIG. 7, in one or more embodiments the at least one processor is operative to generate a design structure for the integrated circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of longer service life due to reduced potential for electromigration-induced failure) compared to circuits designed using prior art techniques. Alternatively, to achieve similar improvements in service life with prior-art techniques, even if possible, would require larger margins and thus lower-performing circuits as compared to embodiments of the invention.

Figure 9:
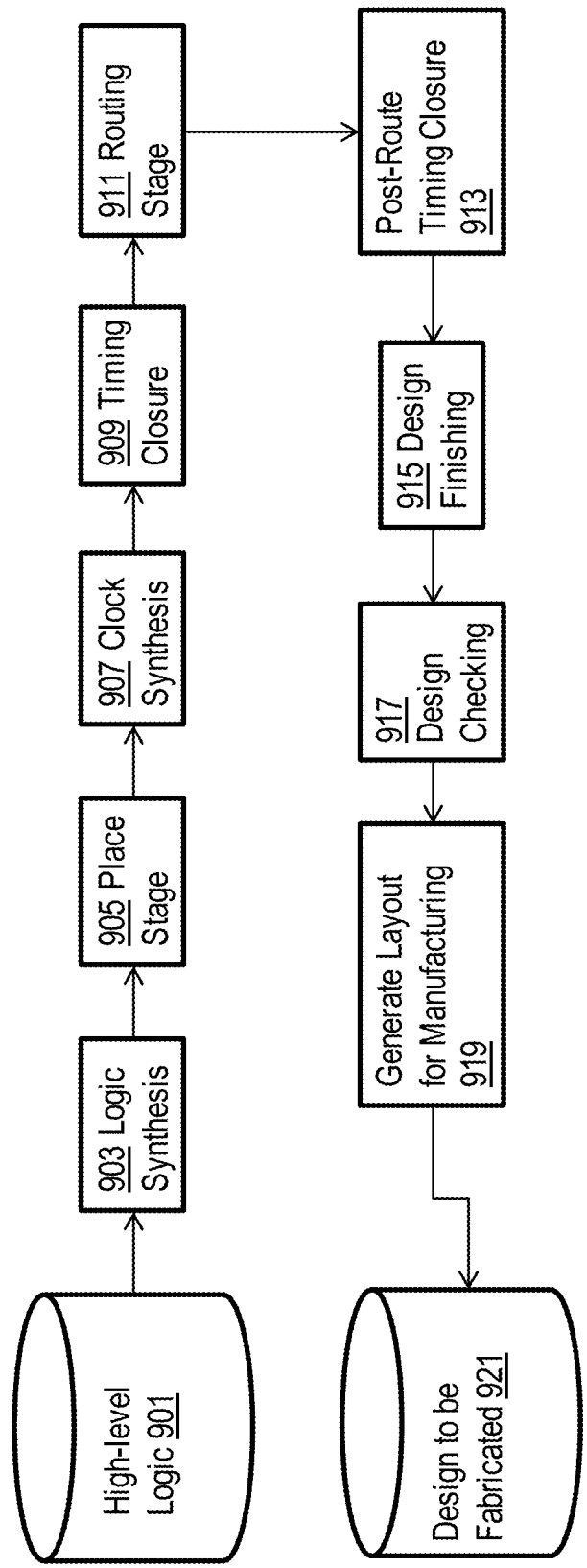
FIG. 9 shows an exemplary high-level Electronic Design Automation (EDA) tool flow, within which aspects of the invention can be employed.

FIG. 9 depicts an example high-level Electronic Design Automation (EDA) tool flow, which is responsible for creating an optimized microprocessor (or other IC) design to be manufactured. A designer could start with a high-level logic description 901 of the circuit (e.g. VHDL or Verilog). The logic synthesis tool 903 compiles the logic, and optimizes it without any sense of its physical representation, and with estimated timing information. The placement tool 905 takes the logical description and places each component, looking to minimize congestion in each area of the design. The clock synthesis tool 907 optimizes the clock tree network by cloning/balancing/buffering the latches or registers. The timing closure step 909 performs a number of optimizations on the design, including buffering, wire tuning, and circuit repowering; its goal is to produce a design which is routable, without timing violations, and without excess power consumption. The routing stage 911 takes the placed/optimized design, and determines how to create wires to connect all of the components, without causing manufacturing violations. Post-route timing closure 913 performs another set of optimizations to resolve any violations that are remaining after the routing. Design finishing 915 then adds extra metal shapes to the netlist, to conform with manufacturing requirements. The checking steps 917 analyze whether the design is violating any requirements such as manufacturing, timing, power, electromigration (e.g., using techniques disclosed herein) or noise. When the design is clean, the final step 919 is to generate a layout for the design, representing all the shapes to be fabricated in the design to be fabricated 921.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 7 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved characterization and simulation of library gates to enable identification and elimination of electromigration violations can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving performance of a computer in identifying and mitigating electromigration violations of a semiconductor device, the method comprising:
   obtaining a set of library gates;
   performing parasitic layout extraction for each gate in the set of library gates to generate an extracted netlist; and
   performing one or more passes of an electromigration analysis of the extracted netlist to characterize each gate over a set of input parameters and to generate a maximum slew rate table and a maximum capacitance table, wherein the maximum slew rate table specifies a maximum allowable slew rate at a gate input such that there are no electromigration violations in a corresponding gate for the selected set of input parameters and wherein the maximum capacitance table specifies a maximum allowable capacitance at a gate output such that there are no electromigration violations in the corresponding gate for the selected set of input parameters.

2. The method of claim 1, where the set of input parameters are any of a voltage, a frequency, an input slew, a temperature, and power on hours.

3. The method of claim 1, where which table parameters to use for rows and columns of the maximum slew rate table, which multiple table parameters to use to create multiple tables, a range of each of the set of input parameters, a number of rows and a number of columns in each table are user selectable.

4. The method of claim 1, where which table parameters to use for rows and columns of the maximum capacitance table, which multiple table parameters to use to create multiple tables, a range of each of the set of input parameters, a number of rows and a number of columns in each table are user selectable.

5. The method of claim 1, where a characterization finds a maximum allowable input slew rate or a maximum allowable output capacitance by performing the one or more passes of the electromigration analysis with an increasing input slew rate and an increasing output capacitance until an electromigration violation is encountered, or by interpolating results with a subset of simulations.

6. The method of claim 1, where an optional analysis is performed with a fastest possible input slew rate that is in a specified design, the optional analysis performed to assure that a Joule heating specification is not violated.

7. The method of claim 1, where the maximum slew rate table can apply to all inputs of a gate collectively, or to one or more of a set of inputs.

8. The method of claim 1, where the maximum slew rate and maximum capacitance tables are generated for a range of temperatures, power on hours, or both.

9. A non-transitory computer readable medium comprising computer executable instructions which when executed by a computer cause the computer to perform the method of:
   obtaining a set of library gates;
   performing parasitic layout extraction for each gate in the set of library gates to generate an extracted netlist; and
   performing one or more passes of an electromigration analysis of the extracted netlist to characterize each gate over a set of input parameters and to generate a maximum slew rate table and a maximum capacitance table, wherein the maximum slew rate table specifies a maximum allowable slew rate at a gate input such that there are no electromigration violations in a corresponding gate for the selected set of input parameters and wherein the maximum capacitance table specifies a maximum allowable capacitance at a gate output such that there are no electromigration violations in the corresponding gate for the selected set of input parameters.

* * * * *